United States Patent [19]
Schofield et al.

[11] Patent Number: 5,385,815
[45] Date of Patent: Jan. 31, 1995

[54] PHOTOGRAPHIC ELEMENTS CONTAINING LOADED ULTRAVIOLET ABSORBING POLYMER LATEX

[75] Inventors: Edward Schofield, Penfield; Richard P. Szajewski, Rochester, both of N.Y.

[73] Assignee: Eastman Kodak Company, Rochester, N.Y.

[21] Appl. No.: 175,041

[22] Filed: Dec. 29, 1993

Related U.S. Application Data

[63] Continuation-in-part of Ser. No. 907,008, Jul. 1, 1992.

[51] Int. Cl.⁶ .................. G03C 1/815; G03C 1/825
[52] U.S. Cl. ..................... 430/512; 430/381; 430/384; 430/385; 430/495; 430/505; 430/548; 430/552; 430/553; 430/558; 430/931
[58] Field of Search ............ 430/496, 510, 512, 517, 430/505, 548, 557, 553, 558, 381, 384, 385, 931

[56] References Cited

U.S. PATENT DOCUMENTS

| | | | |
|---|---|---|---|
| 4,247,627 | 1/1981 | Chen | 430/512 |
| 4,340,664 | 7/1982 | Monbaliu et al. | 430/449 |
| 4,455,368 | 6/1984 | Kojima et al. | 430/507 |
| 4,464,462 | 8/1984 | Sugimoto et al. | 430/512 |
| 5,066,572 | 11/1991 | O'Connor et al. | 430/503 |

FOREIGN PATENT DOCUMENTS

| | | |
|---|---|---|
| 63264748 | 4/1987 | Japan . |
| 01142634 | 11/1987 | Japan . |

*Primary Examiner*—Jack P. Brammer
*Attorney, Agent, or Firm*—Gordon M. Stewart

[57] ABSTRACT

A photographic element comprising a UV absorbing polymer latex which is loaded with a non-polymeric UV absorbing compound. The polymer is a homopolymer or heteropolymer comprising monomeric units containing a 2-hydroxybenzotriazole. The benzotriazole preferably is of the formula I:

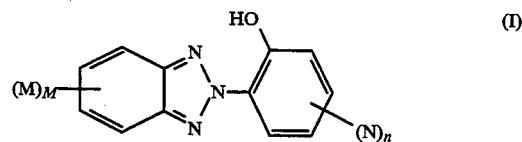

wherein: the phenyl ring and benzo ring are optionally additionally substituted; and one of m and n is 1, and M and N have the formula:

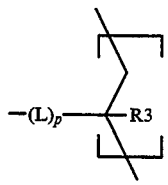

wherein R3 is H or an alkyl group; L is a bivalent linking group; and p is 0 or 1. The elements may additionally have a polmer present (which is preferably different from the UV absorbing polymer) which has a glass transition temperature ($T_g$) of less than 5° C.

21 Claims, No Drawings

PHOTOGRAPHIC ELEMENTS CONTAINING LOADED ULTRAVIOLET ABSORBING POLYMER LATEX

CROSS REFERENCE TO RELATED APPLICATIONS

This application is a continuation-in-part of U.S. patent application Ser. No. 07/907,008, filed Jul. 07, 1992, pending entitled "Photographic Elements Incorporating Polymeric Ultraviolet Absorbers" filed Jul. 1, 1992 by Chen et al.

FIELD OF THE INVENTION

This invention relates to photographic elements which contain an ultraviolet ("UV") absorbing polymer latex, which latex is loaded with a non-polymeric ultraviolet absorbing compound.

BACKGROUND OF THE INVENTION

It is desirable that a light sensitive photographic material be insensitive to handling. A photographic material should not produce density marks as a result of static discharge or pressure events encountered, for example, during the manufacture or use of the material. Additionally, the photographic material should be resistant to physical scratches and gouging during handling. In the case of photographic materials intended for viewing or printing, such marks are visually objectionable, while in the case of photographic materials intended for medical imaging, such marks can produce dangerous misdiagnoses.

U.S. Pat. No. 5,066,572 relates to alleviating pressure induced fog in photographic materials comprising silver halide emulsions by adding a low Tg polymer latex to a light insensitive layer. Other approaches to pressure-fog control and other uses of polymeric latexes are described in U.S. Pat. Nos. 4,464,462; 4,551,412; and 4,822,727 as well as in Japanese Kokai J01/267,638 and J01/291,251.

Static discharge marks in photographic materials may be alleviated by inclusion of a UV light absorbing species at an appropriate location in the material. Typical monomeric UV absorbers include, but are not limited to, 2-hydroxyphenyl benzotriazoles, 2-hydroxy phenyl salicilates, 2-hydroxybenzophenones, benzilidene malonates, substituted acrylonitriles, and derivatives thereof.

In addition to the above problems, the silver halide of typical photographic elements has a native sensitivity to UV which is usually undesirable. Such UV sensitivity may result in a visible image on the photographic element which image is otherwise invisible to the human eye on directly viewing the photographed scene. In addition, in the case of color photographic elements, in particular, color dye images formed on the light sensitive emulsion layers by color development easily undergo fading or discoloration due to the action of UV. Also, color formers, or so-called couplers, remaining in the emulsion layers are subject to the action of UV to form undesirable color stains on the finished photographs. The fading and the discoloration of the color images are easily caused by UV of wavelengths near the visible region, namely, those of wavelengths from 300 to 400 nm. For the foregoing reasons, photographic elements typically incorporate a UV absorbing material as a UV stabilizer in an uppermost layer (that is, the layer that will first receive radiation when the element is in normal use). The wavelength range to be filtered is typically about 300 to 400 nm for non-silver iodide print films not protected by glass and 320 to 400 nm for non-silver iodide print films protected by glass. The wavelength range may be extended to higher wavelengths in films comprising silver iodide, as for example in many color negative and color reversal camera films, so as to provide protection for the native blue sensitivity of such emulsions.

The monomeric UV absorbers previously mentioned for alleviating static discharge marks are also known to function as UV stabilizers.

The preparation and use of UV absorbers has been described at U.S. Pat. Nos. 3,813,255 and 4,611,061; and at European Published Applications 0,057,160 and 0,190,003. Polymeric UV absorbers are also known. U.S. Pat. No. 4,464,462 describes polymeric UV light absorbing latexes which are said to provide static discharge protection without aggravating pressure-fog. This reference does not describe scratching or gouging properties of photographic materials including such species.

U.S. Pat. No. 4,340,664 describes the use of polymeric photographically useful latexes. This reference also describes the optional loading of these latexes with other photographically useful materials. At column 12 lines 34 and following, this reference teaches that the loaded material may have a function similar to that of the polymer latex, and that the functions will then be additive.

It would be desirable then to provide a photographic element containing a composition which provides the element with resistance to handling defects while at the same time providing good UV absorbtion.

SUMMARY OF THE INVENTION

The present invention provides a photographic element with a composition which conveys good UV absorption and resistance to static discharge marks. Accordingly, the present invention provides a photographic element comprising a UV absorbing polymer latex which is loaded with a non-polymeric UV absorbing compound, wherein the polymer is a homopolymer or heteropolymer comprising monomeric units containing a benzotriazole. By "loaded" or "loading" or similar terms, is meant that the latex particles contain the particular compound "loaded" therein (particularly the non-polymeric UV absorbing compound).

EMBODIMENTS OF THE INVENTION

By "non-polymeric" UV absorbing compounds as referenced in the present application, is meant compounds which contain no more than four (and preferably no more than two) repeating units. Particularly preferred are monomeric compounds. By polymeric UV absorbing compounds is meant compounds which contain at least 10, and preferably at least 20 (more preferably at least 50) repeating units. Typically the polymers would have hundreds (for example, three hundred or more) or several thousand (for example, three thousand or more) repeating units. When reference herein is made to a substituent "group", this means that the substituent may itself be substituted or unsubstituted (for example "alkyl group" refers to a substituted or unsubstituted alkyl). Any such groups may broadly be linear or branched where possible. For a compound to be considered a UV absorbing one in the present invention, it should at least absorb somewhere in the 300 to 400nm region of the spectrum.

Preferably the polymer (which may be a homopolymer or heteropolymer) of the polymer latex comprises repeating monomeric units of a 2-hydroxyphenylbenzotriazole, particularly units of formula I below:

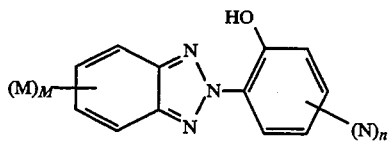

wherein: the phenyl ring and benzo ring are optionally additionally substituted; and one of m and n is 1, and M and N have the formula:

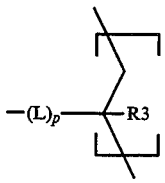

wherein R3 is H or an alkyl group (particularly a 1 to 8 carbon atom alkyl group such as substituted or unsubstituted methyl, ethyl or propyl); L is a bivalent linking group; and p is 0 or 1.

Preferably, the repeating units of formula I are of the formula IA or IB below:

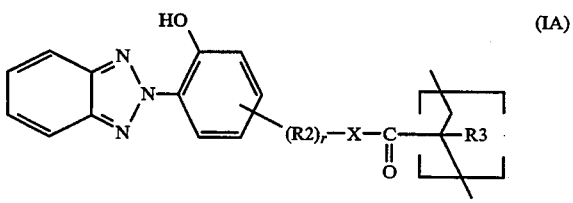

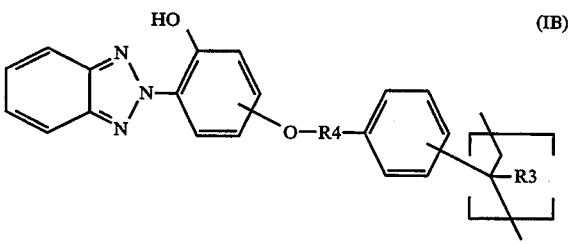

wherein:
X is O or NH;
$R_2$ is 1 to 10 carbon atom alkylene group; and
$R_3$ is H or 1 to 8 carbon alkyl group
R4 is a 1 to 10 carbon atom alkylene group (preferably 1 carbon atom);
r is 0 or 1; and
the phenyl rings and benzo rings are optionally additionally substituted.

In the above formula IA and IB, the R2 (formula IA) or the oxygen of -O-R4- (formula IB) may be appended to the 3- or 4-position of the phenyl ring (considering the benzotriazole as being on the 1-position of the phenyl ring).

The repeating units of formula IA may be of formula IA' below while those of formula IB may be of formula IB' below:

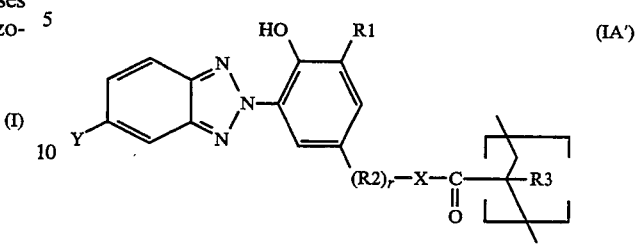

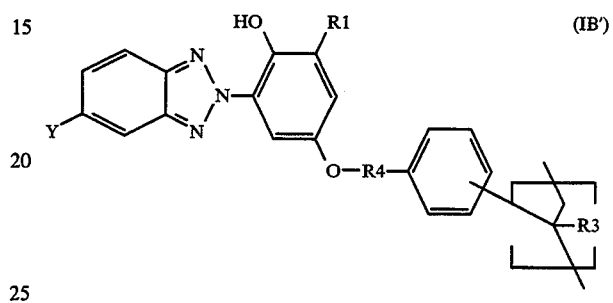

wherein:
$R_1$ is selected from the group consisting of H, halogen, an alkoxy group, or an alkyl group of 1 to 8 carbons; and
Y is H or halogen (such as chlorine, fluorine or bromine).

The polymer may be a homopolymer or copolymer. Copolymers may include any other monomers of formula I or other monomers comparable with the polymer and the photographic environment. Furthermore, two or more of the UV absorbing polymers can be present in the polymer latex together, or with other UV absorbing polymeric agents described in the prior art. The copolymers may particularly include repeating units derived from acrylate, alkylacrylate, acrylamide, alkylacrylamide or vinyl aromatic monomers having a formula other than I. Particularly, a copolymer may contain units of the formula:

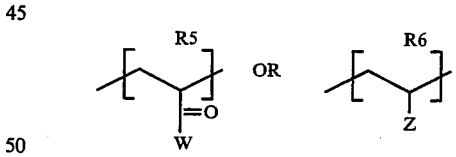

wherein: W is substituted or unsubstituted amino, substituted or unsubstituted alkoxy, substituted or unsubstituted phenoxy; Z is a substituted or unsubstituted phenyl; and R5 and R6 are H or a substituted or unsubstituted 1 to 6 carbon atom alkyl.

The substituents on the above described groups for R1 through R6, and W and Z, and on the benzo and phenyl rings as well any group indicated as possibly being substituted herein, can include any known substituents, such as halogen (for example, chloro, fluoro, bromo, iodo), alkoxy (for example, methoxy, ethoxy), substituted or unsubstituted alkyl (for example, methyl, trifluoromethyl), alkenyl, thioalkyl (for example, methylthio or ethylthio), substituted and unsubstituted aryl (for example, phenyl) heterocyclic structures (for example, thienyl, furyl, pyrrolyl), alkoxy and others known in the art. Such alkyl and alkoxy substituents may specifically include "lower" alkyl and alkoxy, that is having from 1 to 6 carbon atoms, for example, methyl, ethyl, and the like. Additionally, substituents may form bridged linkages. Further, with regard to any alkyl group, alkylene group or alkenyl group, it will be understood that these can be branched or unbranched and include ring structures.

Any ethylenically unsaturated comonomer or comonomers can be copolymerized with any of the previously described monomeric units. Such comonomers can include an acrylic acid, an α-alkylacrylacid (such as methacrylic acid, etc.), an ester or amide derived from an acrylic acid(for example, acrylamide, methacrylamide, n-butylacrylamide, t-butylacrylamide, diacetone acrylamide, methyl acrylate, ethyl acrylate, n-propylacrylate, n-butyl acrylate, t-butyl acrylate, isobutyl acrylate, 2-ethylhexyl acrylate, n-octyl acrylate, lauryl acrylate, 2-ethoxyethyl acrylate, 2-methoxyethyl acrylate,-methyl methacrylate, ethyl methacrylate, n-butyl methacrylate, b-hydroxyl methacrylate, etc.), a vinyl ester(-for example, vinyl acetate, vinyl propionate, vinyl laurate, etc.), acrylonitrile, methacrylonitrile, an aromatic vinyl compound (for example, styrene and a derivative thereof, for example, vinyl toluene, divinylbenzene, vinyl acetophenone, sulfostyrene, etc.), itaconic acid, citraconic acid, crotonic acid, vinylidene chloride, a vinyl alkyl ether(for example, vinyl ethyl ether, etc.), an ester of maleic acid, N-vinyl-2-pyrrolidone, N-vinylpyridine, 2- or 4-vinylpyridine, etc., an sulfonic acid containing monomers, (for example, acrylamido-2,2'-dimethyl-propane sulfonic acid, 2-sulfoethyl methacrylate, 3-sulfopropyl methacylate, and the like).

Of these monomers, esters of acrylic acid, esters of methacrylic acid, and aromatic vinyl compounds are preferred.

Two or more of the UV absorbing monomers of the type of formula I, can be copolymerized together. Additionally, one or more of such monomers can be copolymerized with one or more other UV absorbing monomers described in the prior art. For example, a combination of butyl acrylate and acrylamido-2,2'-dimethyl propane sulfonic acid can be present in a polymer containing units of formula I. Of the foregoing comonomers, an ester of acrylic acid, an ester of methacrylic acid, and an aromatic vinyl compounds are particularly preferred.

It is preferred that the photographic elements of the present invention have UV absorbing polymers in which the molar ratio of the amount of repeating units formed from a comonomer to the amount of repeating units of formula I, be from 0 to 10, and a molar ratio of from 0 to 5 is particularly preferred. The molar ratio of repeating units of other than formula I in the copolymer to repeating units of formula I, is particularly preferably no more than 4 to 1. The ethylenically unsaturated comonomer which is used to copolymerize with the UV absorbing monomer of formula (I), can be selected to impart desired physical and/or chemical properties to the copolymer to be prepared, for examples, glass transition temperature, particle size, compatibility with a binder such as gelatin or other photographic additives, for example, anti-oxidants and known color image forming agents, etc.

Non-polymeric UV absorbing agents which can be loaded into the UV absorbing polymers of the photographic elements of the present invention, can include any non-polymeric compound having an absorbtion in the 250 to 450 nm range (and more preferably in the range of 300 nm to 400nm. Such compounds can, for example, be selected from the following types of UV absorbing agents: benzotriazoles such as 2-(2-hydroxy-5-methylphenyl)-2H-benzotriazole, 2-(2-hydroxy-3,5-di-tert-butylphenyl)-2H-benzotriazole, 2-(2-hydroxy-3-tert-butyl-5-methylphenyl)-2H-benzotriazole, 2-(2-hydroxy-3,5-di-tert-butylphenyl)-5-chloro-2H-benzotriazole, 2-(2-hydroxy-3,5-di-tert-amylphenyl)-2H-benzotriazole, 2-(2-hydroxy-3,5-di(1,1-dimethylbenzyl)-phenyl)-2H-benzotriazole, 2-(2-hydroxy-5-tert-octylphenyl)-2H-benzotriazole; p-hydroxybenzoates; phenylesters of benzoic acid; benzophenones (for example, 2-hydroxybenzophenones); salicylanilides; salicilates (for example, 2-hydroxy phenyl salicilates); oxanilides; diketones; benzylidene malonates; esters of 1-cyano-b-phenylcinnamic acid; substituted acrylonitriles; and organic metal photostabilizers; derivatives of any of the foregoing; and others such as described in J. F. Rabek, *Photostabilization of Polymers, Principles and Applications*, Elsevier Science Publishers LTD, England, page 202–278 (1990).

High boiling point organic solvents can also be loaded into the polymeric UV absorbers in the photographic elements of the present invention to also alter their photographic performance. Examples of such high-boiling organic solvents include: tricresyl phosphate, di-n-butyl phthalate, N-n-amylphthalimide, bis(2-methoxyethyl)phthalate, dimethyl phthalate, ethyl N,N-di-n-butyl-carbamate, diethyl phthalate, n-butyl 2-methoxybenzoate, 2-(n-butoxyethyl) phthalate, ethyl benzylmalonate, n-amyl phthalate, n-hexyl benzoate, guaiacol acetate, tri-m-cresyl phosphate, diethyl sebacate, di-isoamyl phthalate, ethyl phenylacetate, phorone, di-n-butyl sebacate, dimethyl sebacate, N,N-diethyl lauramide, N,N-di-n-butyl lauramide, phenethyl benzoate, benzyl benzoate, dioctyl phthalate, dioctyl sebacate, quinitol bis(2-ethylhexoate), cresyl diphenyl phosphate, butyl cyclohexyl phthalate, tetrahydrofurfuryl adipate, tetrahydrofurfuryl benzoate, tetrahydrofurfuryl propionate, tetrahydrofurfuryl palmitate, quaiacol n-caproate, bis(tetrahydrofurfuryl)phthalate, N,N-diethylcapramide, 2,4-di-tert-amylphenol, 1-lauryl piperidine, N-n-butylacetanilide, N,N,N',N'-tetraethyl phthalamide, N,n-amylsuccinimide, diethyl citrate, 2,4-di-n-amylphenol, 1,4-cyclohexyllemedimethylene bis(2-ethylhexanoate), benzylbutyl phthalate, p-dodecylphenol, trihexylphosphate, isopropyl palmitate, and bis(2-ethylhexyl)sulfoxide, etc.

The photographic elements of the present invention may additionally have present in the same layer as the loaded UV absorbing latex, a low $T_g$ polymer with a glass transition temperature of less than 5° C., the two polymers being the same or different. Alternatively, the elements may have a separate stress absorbing layer between an emulsion layer and an overcoat layer. In either event, the low $T_g$ polymer and the hydrophilic colloid are in a mass ratio of greater than or equal to about 1:1. The additional presence of such a low $T_g$ polymer provides the element with good pressure-fog control. Typically, the polymeric latex simply contains both polymers (where different) or at least the single UV absorbing polymer when it has a glass transition temperature of less than 5° C. Such polymers, their use and advantages, are described in allowed U.S. patent application Ser. No. 07/989,750 by K. Lushington, R. Szajewski, and K. O'Connor under the title "PHOTOGRAPHIC ELEMENT CONTAINING STRESS ABSORBING PROTECTIVE LAYER", which application is incorporated herein by reference. As described in that application, the element may additionally contain a relatively high $T_g$ polymer also (for example, with a $T_g$ above 5° C.), to improve dry scratch resistance. The high $T_g$ polymer may particularly be the UV absorbing polymers of the present invention. Any of the types of polymers of that application may be used in the photographic elements of the present invention (either in addition to the polymers of the loaded UV absorbing polymers, or the polymers of the loaded UV absorbing polymers of the present application may simply meet the requirements of the polymers of that application). Furthermore, the layer containing the UV absorbing polymer latex and the polymer with a $T_g$ below 5° C. is preferably a layer between a light sensitive silver halide emulsion layer and an overcoat layer (that is, the foregoing layer is preferably above the light sensitive layer furthest from a support of the element, but below the uppermost layer). In an alternative embodiment, the layer containing the loaded UV absorbing polymeric latex may be on the opposite side of a transparent support from any light sensitive layer. In a further alternative embodiment the layer containing the loaded UV polymeric latex may be between the support and a light sensitive layer.

In making photographic elements of the present invention, the polymer latex may be formed by any of the known three methods described below. As described, the first method is by an emulsion polymerization method. Emulsion polymerization is well known in the art and is described in F. A. Bovey, *Emulsion Polymerization*, issued by Interscience Publishers Inc. New York, 1955. Examples of the chemical initiators which may be used include a thermally decomposable initiator, for examples, a persulfate (such as ammonium persulfate, potassium persulfate, etc), hydrogen peroxide, 4,4'-azobis(4-cyanovaleric acid), and redox initiators such as hydrogen peroxide-iron(II) salt, potassium persulfate-sodium hydrogensulfate, cerium salt-alcohol, etc. Emulsifiers which may be used in the emulsion polymerization include soap, a sulfonate(for example, sodium N-methyl-N-oleoyltaurate, etc.), a sulfate( for example, sodium dodecyl sulfate, etc.), a cationic compound(for example, hexadecyl trimethylammonium bromide, etc.), an amphoteric compound and a high molecular weight protective colloid(for example, polyvinyl alcohol, polyacrylic acid, gelatin, etc.). Specific examples and functions of the emulsifiers are described in *Belgische Chemische Industrie*, Vol. 28, pages 16–20(1963). Emulsion polymerization of solid water-insoluble UV absorbing monomer is usually carried out in an aqueous system or a water/organic solvent system. Organic solvents which can be used are preferably those which have high water miscibility, are substantially inert to the monomers to be used, and do not interrupt usual reactions in free radical addition polymerization. Preferred examples include a lower alcohol having from 1 to 4 carbon atoms (for example, methanol, ethanol, isopropanol, etc.), a ketone(for example, acetone, etc.), a cyclic ether (for example, tetrahydrofuran, etc.), a nitrile (for example, acetonitrile,etc.), an amide (for example, N,N-dimethylforamide, etc.), a sulfoxide (for example, dimethylsulfoxide), and the like. This method is the most direct way of preparing a polymer latex as described in U.S. Pat. Nos. 4,464,462; 4,455,368 and European Patent publication 0 190 003(1991).

For making photographic elements of the present invention, the second way of forming a polymer (latex of the ultraviolet absorber is by solution polymerization of a monomer mixture of UV absorbing monomer (I), a comonomer and an ionic comonomer containing sulfonic, sulfuric, sulfinic, carboxylic or phosphoric acid groups. Suitable ionic comonomers may include acrylamido-2,2'-dimethyl-propane sulfonic acid, 2-sulfoethyl methacrylate, or sodium styrene sulfonate. Examples of the chemical initiators commonly used include azo type initiators (for example, 2,2'-azobisisobutyronitrile, dimethyl 2,2'-azobisisobutyrate, 4,4'-azobis(4-cyanovaleric acid) and the like), and peroxide type initiators(for example, benzoyl peroxide, lauroyl peroxide, and the like). The polymer solution obtained is then dispersed in an aqueous solution with or without additional surfactants to form a latex.

The third way of forming an ultraviolet absorber polymer latex for photographic elements of the present invention, is by solution polymerization of a monomer mixture comprising UV absorbing monomer(I) and other comonomers. An organic solvent is used to dissolve the hydrophobic polymeric UV absorbing agent and the solution is dispersed in an aqueous solution of gelatin in the form of latex as described in U.S. Pat. No. 4,455,368(1984). The solvent is removed from the mixture prior to coating of the dispersion or by volatilization during drying of the dispersion coated, although the latter is less preferable. Solvents which may be used include those which have a certain degree of water solubility so as to be capable of being removed by washing with water in a gelatin noodle state, and those which can be removed by spray drying, vacuum or steam purging. Examples of the organic solvents capable of being removed include an ester (for example, ethyl acetate), a lower alkyl ether, a ketone, a halogenated hydrocarbon, an alcohol and a combination thereof. Any type of dispersing agent can be used in the dispersion of the hydrophobic polymeric UV absorbing agent. However, ionic surface active agents, and particularly anionic surface active agents, are preferred. In order to increase the dispersion stability and sometimes improve the photographic performance of the polymeric UV absorbing agent, a small amount of a high-boiling point organic solvent, for example, dibutyl phthalate, tricresyl phosphate, p-dodecyl phenol, 1,4-cyclohexylenedimethylene bis(2-ethylhexanoate), and the like may be added. It is preferred that the amount thereof is as small as possible so as to decrease the thickness of the final emulsion layer or the hydrophilic colloid layer in order to maintain good sharpness.

As to the method of loading the non-polymeric UV absorber or other compound into the polymer latex, "loading" a polymer latex is generally described in U.S. Pat. No. 4,199,363 for example. There are several methods of loading the polymer latex. First, an aqueous dispersion of a non-polymeric UV absorber or other compound (or mixture of such compounds) is prepared by the conventional colloid mill process in the presence of gelatin. This dispersion is then blended with the polymer latex such that the weight ratio of non-polymeric UV absorber to polymer latex is between 1:99 to 99:1, and more preferably between 1:9 to 9:1.

In a second method, the non-polymeric UV absorber is loaded into the polymeric UV absorbing agent in the presence of low boiling organic solvents, such as methanol or acetone. The auxiliary solvent is then evaporated with a rotarary evaporator. The same weight ratios of non-polymeric UV absorber to polymeric UV absorber used in the above method can be used in this method also.

Loading of a polymer latex is described, for example, in U.S. Pat. Nos. 4,203,716, 4,214,047, 4,247,627, 4,497,929 and 4,608,424.

Some examples of particular polymeric UV absorbers which may be used in photographic elements of the present invention are provided below as formulae P-1 to P-27. Formula P-13 is a homopolymer whereas the remainder are copolymers. Note that further samples of polymeric UV absorbers could be the same as any of those of P-1 to P-20 below except that the UV absorbing unit (that is, the 2-hydroxyphenylbenzotriazole containing unit) may have the polymerized vinyl group in the meta position with respect to the —CH$_2$— group rather than in the para position shown in most of the formulae. Alternatively, mixtures of both the meta and para isomers can be used in any of those polymers. Both the UV absorbing monomers and the corresponding polymer latexes can be prepared in the same or similar manner as described in EP 0 190 003 B1 (inventors Schofield et al., filed Jan. 22, 1986), or as described in U.S. Patent Application entitled "Method of Preparing Photographic Elements Incorporating Polymeric Ultraviolet Absorbers Loaded with High Boiling Point Organic Solvents and Resultant Photographic Elements", filed by E. Schofield and T. Chen on the same day as the present application which are incorporated herein by reference. The formulae are based on molar ratios of monomers.

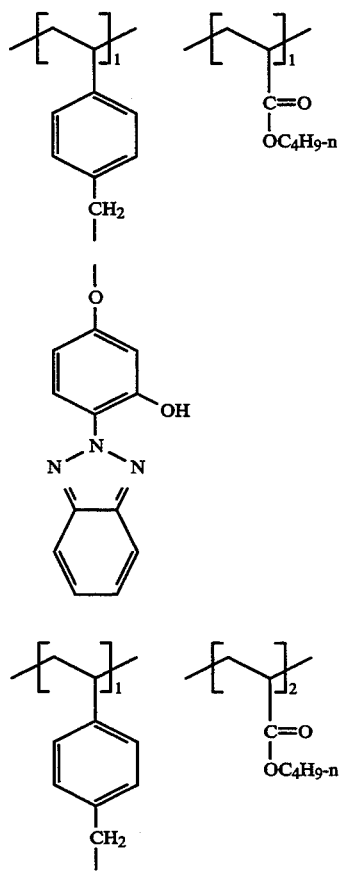

P-1

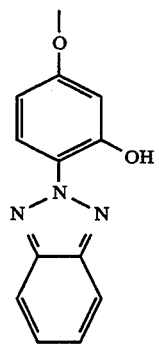

P-2

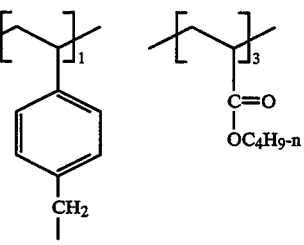

P-3

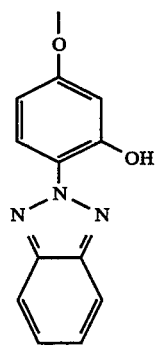

P-4

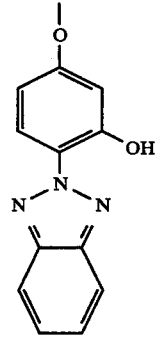

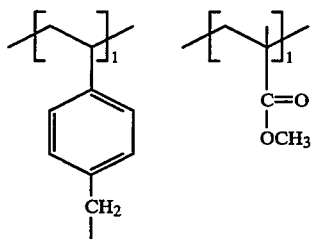
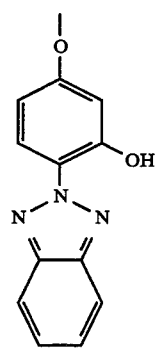
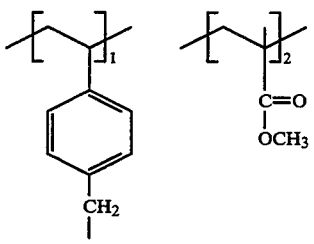
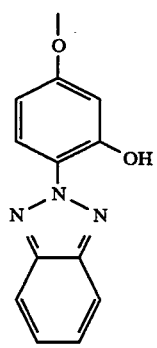
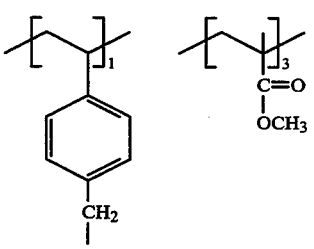
P-5
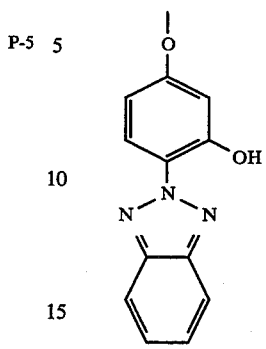
P-6
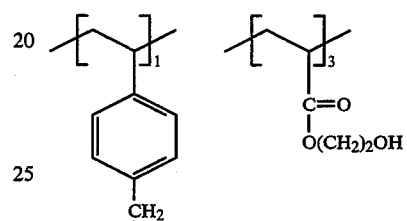
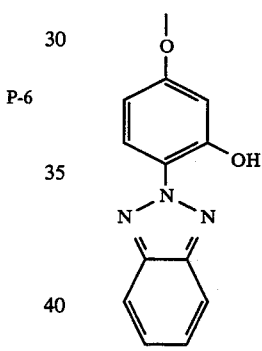
P-7
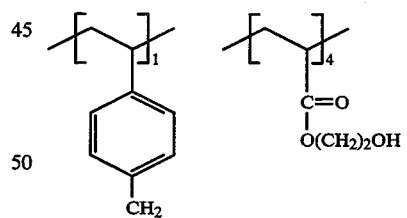
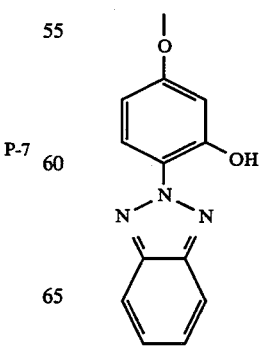
P-8
P-9

-continued
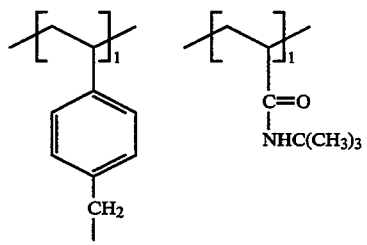
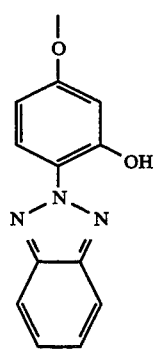
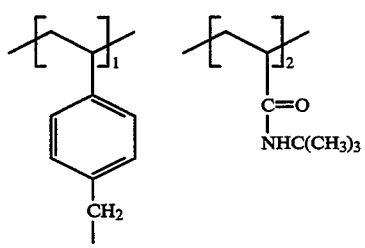
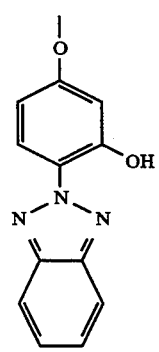
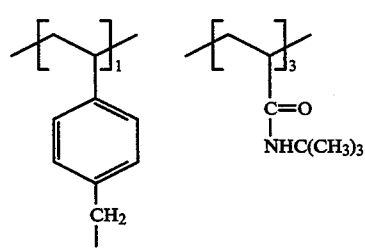
-continued
P-10 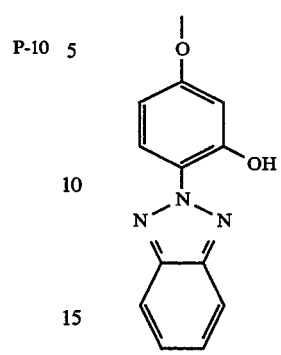
P-11 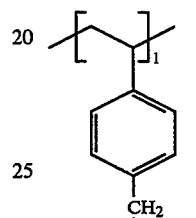
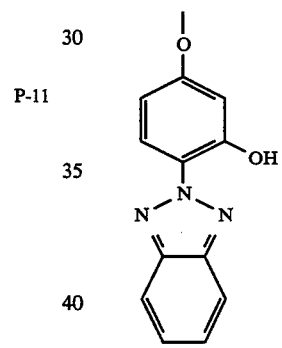
P-13
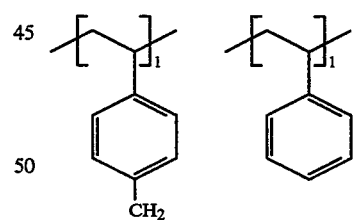
P-12 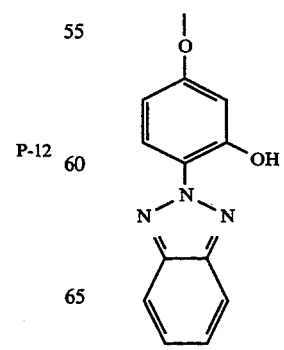
P-14

-continued
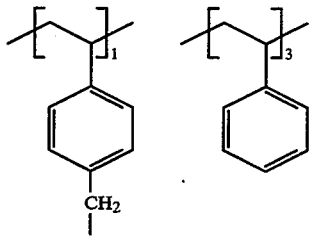
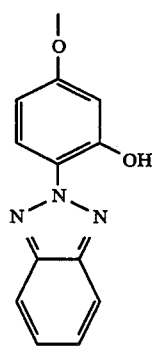
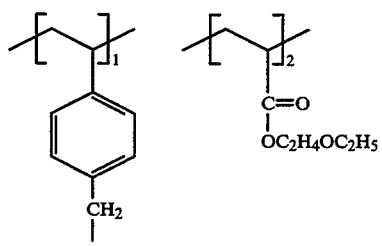
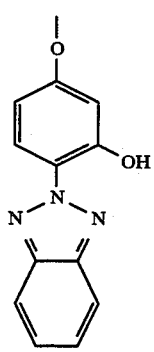
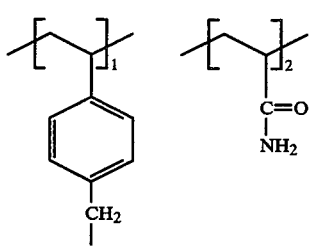
-continued
P-15
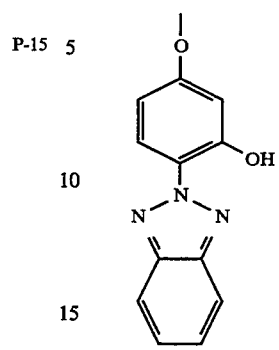
P-18
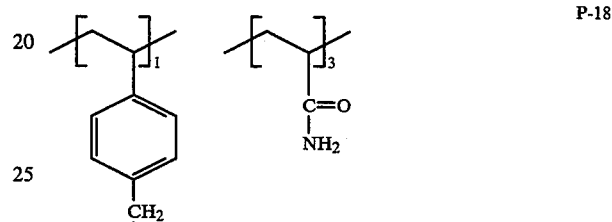
P-16
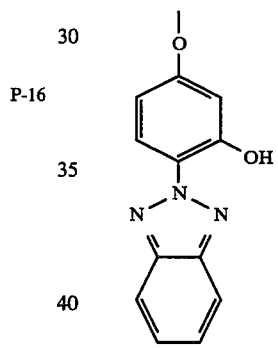
P-19
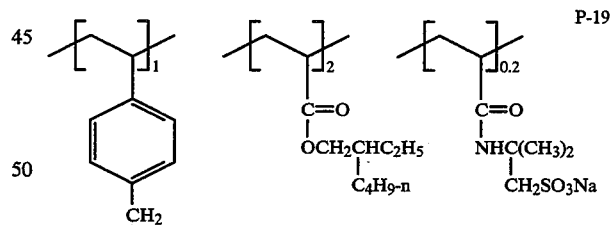
P-17
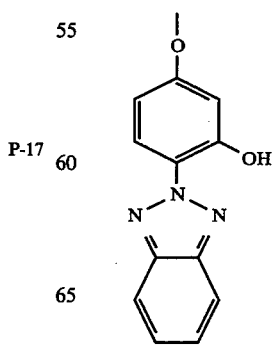

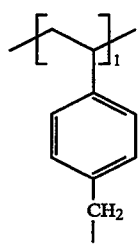 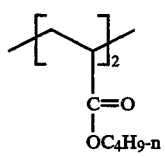 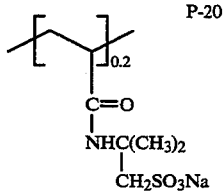
P-20
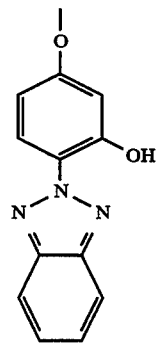
Other examples of UV absorbing polymers can include homopolymers or copolymers made from monomers M-1 to M-10 below:
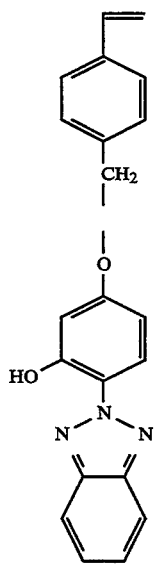
M-1
M-2
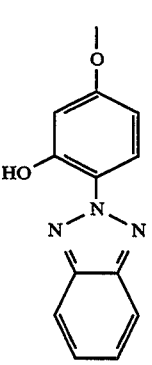
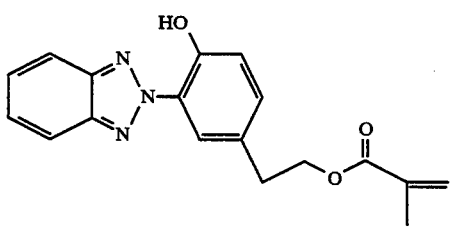 M-3
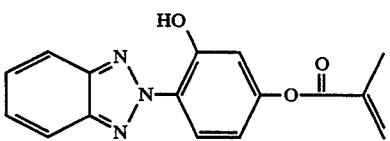 M-4
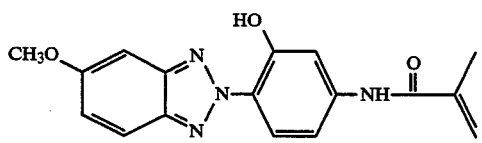 M-5
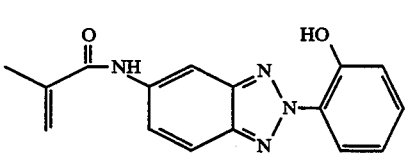 M-6
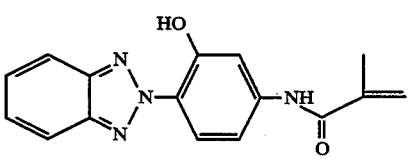 M-7
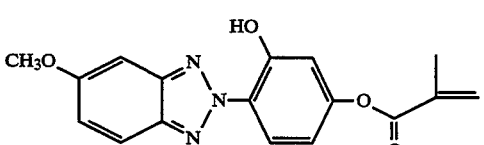 M-8
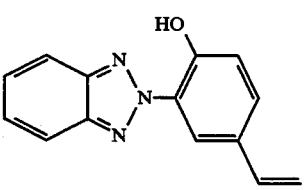 M9

-continued

M-10

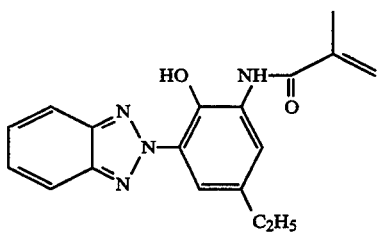

The loaded polymer dispersion is incorporated into the photographic element (typically into a gelatin gel thereof) in an amount of between 0.01 g/m² and 5 g/m², and more preferably between 0.10 g/m² to 2.0 g/m². Furthermore, the weight ratio of non-polymeric ultraviolet absorber loaded into the UV absorbing polymer latex to the UV absorbing polymer latex is between 1:99 to 99:1, and more preferably between 1:9 to 9:1. The polymer latex is added to any one or more of the layers (for example, a hydrophilic colloid layer) of a photographic light-sensitive material (for example, a silver halide photographic light-sensitive material), such as a surface protective layer, an intermediate layer or a silver halide emulsion layer, and the like. For example, in photographic paper the UV absorbing polymer latex may be positioned above and/or below the red sensitive layer (typically adjacent to it), the red sensitive layer typically being the uppermost light sensitive layer in color paper, or even completely or partially within the red sensitive layer.

As to the supports in photographic elements of the present invention, they may particularly be thinner than conventional supports. Support thicknesses of about 50 to about 130 microns are preferred. Thinner supports enable smaller film cartridges. However, thinner supports may be less able to absorb static discharges during manufacture and use. Additionally, the combination of a polymeric UV latex loaded with a UV dye and low Tg polymer may provide enhanced scratch and pressure fog protection when used in spools and cameras designed for thin support films. Such uses are described, for example, in U.S. patent application Ser. No. 08/034,061 entitled "Photographic Camera Film Containing A High Chloride Tabular Grain Emulsion With Tabular <100> Major Faces", and in EP 0 466 417A and EP 0 553 785. Since the loaded UV latexes used in photographic elements of the present invention advantageously have low yellow density (at 420 nm and higher), photographic elements of the present invention may particularly be combined with film supports comprising low densities of magnetic particles (such as described in EP 0 459 349 A) to enable improved printing.

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. Nos. 4,279,945 and U.S. 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, with the reverse order on a reflective support being typical.

The photographic elements of the present invention can be single color elements or multicolor elements (preferably multicolor elements). Multicolor elements typically contain dye image-forming color units sensitive to each of the three primary regions of the spectrum. Usually the units are in the form of different color records. As used herein, the terms "record" or "color record" refer to one or more silver halide containing layers sensitive to the same region of the electromagnetic spectrum. In some cases the multicolor elements may contain records sensitive to other regions of the spectrum or to more than three regions of the spectrum. Each record can be comprised of a single emulsion layer or of multiple emulsion layers sensitive to a given region of the spectrum. The layers of the element, including the layers of the image-forming records, can be arranged in various orders as known in the art. Typically, the order of the color sensitive records will be red-sensitive, green-sensitive and blue-sensitive, in that order, on a transparent support. The reverse order is typically used on a reflective support (paper being the typical reflective support). In an alternative format, the emulsions sensitive to each of the three primary regions of the spectrum can be arranged as a single segmented layer.

A typical multicolor photographic element comprises a support bearing a cyan dye image-forming record comprising at least one red-sensitive silver halide emulsion layer having associated therewith at least one cyan dye-forming coupler, a magenta image forming record comprising at least one green-sensitive silver halide emulsion layer having at least one magenta dye-forming coupler and a yellow dye image-forming record comprising at least one blue-sensitive silver halide emulsion layer having associated therewith at least one yellow dye-forming coupler. As used herein, blue light means light of about 400 to 500 nm wavelength, green light means light of about 500 to 600 nm wavelength, and red light means light of about 600 to 700 nm wavelength. In some instances it may be advantageous to employ other pairings of silver halide emulsion sensitivity and dye image-forming couplers, as in the pairing of an infra-red sensitized silver halide emulsion with a magenta dye-forming coupler or in the pairing of a blue-green sensitized emulsion with a coupler enabling minus-cyan dye formation. The material can contain additional layers, such as filter layers, interlayers, overcoat layers, subbing layers, and the like. All of these can be coated on a support which can be transparent or reflective (for example, a paper support). The layers of the material above the support typically have a total thickness of between about 5 and 30 microns. The total silver content of the material is typically between 1 and 10 grams per m².

It is generally preferred to minimize the thickness of the element above the support so as to improve sharpness and improve access of processing solutions to the components of the element. For this reason, thicknesses of less than 25 microns are preferred and thicknesses of less than 20 microns are even more preferred. These lowered thicknesses can be especially enabled at manufacture by use of surfactants, polymers, and other coatings aids as known in the art so as to control surface tension and viscosity. Other polymeric materials, humectants, and gelatin plasticizers are known to improve hardening leading to better physical integrity and reduced sensitometric variability over time. Both sharpness and ease of processing may be further improved by minimizing the quantity of incorporated silver in the element. Total silver of less than about 7 grams per square meter is preferred and total silver of less than about 5 grams per square meter is even more preferred. Sharpness in color images is further improved by complete removal of silver and silver halide from the element on processing. Since more swellable elements enable better access of components of processing solutions to the elements of this invention, swell ratios above 1.25 are preferred, with swell ratios of between 1.4 and 6 being more preferred and swell ratios of between 1.7 and 3 being most preferred. The balance of total thickness, total silver and swell ratio most suitable for an element intended for a specific purpose can be readily derived from the image structure, color reproduction, sensitivity and physical integrity and photographic resistance to pressure required for that purpose as known in the art. Use of polymeric materials and gelatin levels as known in the art to further control these photographic and physical properties is recommended.

In the following discussion of suitable materials for use in elements of this invention, reference will be made to *Research Disclosure*, December 1989, Item 308119, published by Kenneth Mason Publications, Ltd., Dudley Annex, 12a North Street, Emsworth, Hampshire P010 7DQ, ENGLAND, which will be identified hereafter by the term "Research Disclosure I." The Sections hereafter referred to are Sections of the Research Disclosure I.

The silver halide emulsions employed in the elements of this invention can be either negative-working, such as surface-sensitive emulsions or unfogged internal latent image forming emulsions, or direct positive emulsions of the unfogged, internal latent image forming type which are positive working when development is conducted with uniform light exposure or in the presence of a nucleating agent. Suitable emulsions and their preparation as well as methods of chemical and spectral sensitization are described in Sections I through IV. Color materials and development modifiers are described in Sections V and XXI. Vehicles which can be used in the elements of the present invention are described in Section IX, and various additives such as brighteners, antifoggants, stabilizers, light absorbing and scattering materials, hardeners, coating aids, plasticizers, lubricants and matting agents are described, for example, in Sections V, VI, VIII, X, XI, XII, and XVI. Manufacturing methods are described in Sections XIV and XV, other layers and supports in Sections XIII and XVII, processing methods and agents in Sections XIX and XX, and exposure alternatives in Section XVIII.

With negative working silver halide a negative image can be formed. Optionally a positive (or reversal) image can be formed although a negative image is typically first formed.

The photographic elements of the present may also use colored couplers (e.g. to adjust levels of interlayer correction) and masking couplers such as those described in EP 213 490; Japanese Published Application 58-172,647; U.S. Pat. No. 2,983,608; German Application DE 2,706,117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193,389; EP 301,477; U.S. Pat. Nos. 4,163,669; 4,865,956; and 4,923,784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912,025); anti-fogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes, either as oil-in-water dispersions, latex dispersions or as solid particle dispersions. Additionally, they may be used with "smearing" couplers (e.g. as described in 4,366,237; EP 96,570; U.S. Pat. Nos. 4,420,556; and 4,543,323. ) Also, the couplers may be blocked or coated in protected form as described, for example, in Japanese Application 61/258,249 or U.S. Pat. No. 5,019,492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 5,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272, 573; 335,319; 336,411; 346, 899; 362, 870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

It is also contemplated that the concepts of the present invention may be employed to obtain reflection color prints as described in Research Disclosure, November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906,559); with ballasted chelating agents such as those in U.S. Pat. No. 4,994,359 to reduce sensitivity to polyvalent cations such as calcium; and with stain reducing compounds such as described in U.S. Pat. Nos. 5,068,171 and 5,096,805. Other compounds useful in the elements of the invention are disclosed in Japanese Published Applications 83-90,959; 83-62,586; 90-072,629, 90-072,630; 90-072,632; 90-072,633; 90-072,634; 90-077,822; 90-078,229; 90-078,230; 90-079,336; 90-079,338; 90-079,690; 90-079,691; 90-080,487; 90-080,489;

90-080,490; 90-080,491; 90-080,492; 90-080,494; 90-085,928; 90-086,669; 90-086,670; 90-087,361; 90-087,362; 90-087,363; 90-087,364; 90-088,096; 90-088,097; 90-093,662; 90-093,663; 90-093,664; 90-093,665; 90-093,666; 90-093,668; 90-094,055; 90-094,056; 90-101,937; 90-103,409; 90-151,577.

The silver halide used in the photographic elements of the present invention may be silver iodobromide, silver bromide, silver chloride, silver chlorobromide, silver chloroiodobromide, and the like. The type of silver halide grains preferably include polymorphic, cubic, and octahedral. The grain size of the silver halide may have any distribution known to be useful in photographic compositions, and may be ether polydispersed or monodispersed. Particularly useful in this invention are tabular grain silver halide emulsions. This is so since tabular grains, while having improved photographic properties, may also exhibit a greater propensity to pressure-fog than other types of grains (such as spherical or cubic). Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $$T = ECD/t^2$$

where

ECD is the average equivalent circular diameter of the tabular grains in microns and t is the average thickness in microns of the tabular grains.

The average useful ECD of photographic emulsions can range up to about 10 microns, although in practice emulsion ECD's seldom exceed about 4 microns. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micron) tabular grains. To achieve the lowest levels of granularity it is preferred to that aim tabular grain projected areas be satisfied with ultrathin (t<0.06 micron) tabular grains. Tabular grain thicknesses typically range down to about 0.02 micron. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micron.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions tabular grains satisfying the stated thickness criteria above account for at least 70 percent of the total grain projected area. In the highest performance tabular grain emulsions tabular grains satisfying the thickness criteria above account for at least 90 percent of total grain projected area.

Suitable tabular grain emulsions can be selected from among a variety of conventional teachings, such as those of the following: *Research Disclosure*, Item 22534, January 1983, published by Kenneth Mason Publications, Ltd., Emsworth, Hampshire 010 7DD, England; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069 and 5,061,616.

The silver halide grains to be used in the invention may be prepared according to methods known in the art, such as those described in *Research Disclosure I* and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as illustrated in *Research Disclosure*, June 1975, item 13452 and U.S. Pat. No. 3,772,031.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours).

While photographic elements of the present invention may be used in any type of camera or exposure system, they may particularly be used in so-called single use cameras (sometimes referred to in the trade as "film with lens" units or other similar terms). Basically, these cameras are sold with a film built-in. The film is not designed to be removed by the end user. The entire camera is returned by a user for processing and the film is then removed and processed. Photographic elements of the present invention may particularly be used in those single use cameras which use cheaper lenses (such as plastic lenses) which may not adequately absorb ambient UV light.

Photographic elements of the present invention are preferably imagewise exposed using any of the known techniques, including those described in *Research Disclosure I*, section XVIII. This typically involves exposure to light in the visible region of the spectrum.

Photographic elements comprising the composition of the invention can be processed in any of a number of well-known photographic processes utilizing any of a number of well-known processing compositions, described, for example, in *Research Disclosure I*, or in James, *The Theory of the Photographic Process* 4th, 1977.

Processing to form a visible dye image includes the step of contacting the material with a color developing agent to reduce developable silver halide and oxidize the color developing agent. Oxidized color developing agent in turn reacts with the coupler to yield a dye.

With negative working silver halide this processing step leads to a negative image. To obtain a positive (or reversal) image, this step can be preceded by development with a non-chromogenic developing agent to develop exposed silver halide, but not form dye, and then uniform fogging of the element to render unexposed silver halide developable. Alternatively, a direct positive emulsion can be employed to obtain a positive image.

Preferred color developing agents are p-phenylenediamines. Especially preferred are:
4-amino N,N-diethylaniline hydrochloride,
4-amino-3-methyl-N,N-diethylaniline hydrochloride,
4-amino-3-methyl-N-ethyl-N-(β-(methanesulfonamido) ethylaniline sesquisulfate hydrate,
4-amino-3-methyl-N-ethyl-N-(β-hydroxyethyl)aniline sulfate,
4-amino-3-β-(methanesulfonamido)ethyl-N,N-diethylaniline hydrochloride and
4-amino-N-ethyl-N-(2-methoxyethyl)-m-toluidine di-p-toluene sulfonic acid.

Development is followed by the conventional steps of bleaching, fixing, or bleach-fixing to remove silver and silver halide, washing, and drying.

Typical bleach baths contain an oxidizing agent to convert elemental silver, formed during the development step, to silver halide. Suitable bleaching agents include ferricyanides, dichromates, ferric complexes of aminocarboxylic acids, such as ethylene diamine tetraacetic acid and 1,3-propylene diamine tetraacetic acid as described at *Research Disclosure*, Item No. 24023 of April, 1984. Also useful are peroxy bleaches such as persulfate, peroxide, perborate, and percarbonate. These bleaches may be most advantageously employed by additionally employing a bleach accelerator releasing compound in the film structure. They may also be advantageously employed by contacting the film structure with a bleach accelerator solution during photographic processing. Useful bleach accelerator releasing compounds and bleach accelerator solutions are discussed in European Patents 0 193 389B and 0 310 125A; and in U.S. Pat. Nos. 4,865,956; 4,923,784; and 4,842,994, the disclosures of which are incorporated by reference.

Fixing baths contain a complexing agent that will solubilize the silver halide in the element and permit its removal from the element. Typical fixing agents include thiosulfates, bisulfites, and ethylenediamine tetraacetic acid. Sodium salts of these fixing agents are especially useful. These and other useful fixing agents are described in U.S. Pat. No. 5,183,727, the disclosures of which are incorporated by reference. Use of a peracid bleach bath and a subsequent low ammonium thiosulfate fixing bath are especially preferred.

In some cases the bleaching and fixing baths are combined in a bleach/fix bath.

The present invention will be further described in the following Examples. In the Examples, UV absorbing polymers POL-1 and POL-2, and monomeric UV absorbing compounds UV-1 and UV-2, are used. The structures for these compounds are below (numbers adjacent each unit represent molar ratios). Note that the UV absorbing unit (that is, the 2-hydroxyphenylbenzotriazole containing units) in POL-1 and POL-2 was actually a mixture of isomers with 40% by weight having the polymerized vinyl group in the meta position of the phenyl ring with respect to —CH$_2$— and 60% being the para isomer shown. When a polymer latex is loaded with a monomeric UV absorber, it is identified as "loaded POLUV-1" (for POL-1) or "loaded POLUV-2 (for POL-2). POL-1 and/or POL-2 when loaded with UV-1 and/or UV-2, provide latexes of a polymeric ultraviolet absorber loaded with non-polymeric UV absorber useful for photographic elements of the present invention.

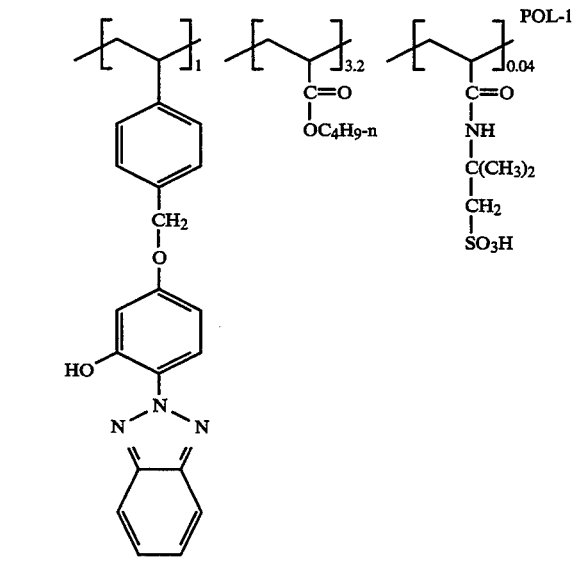

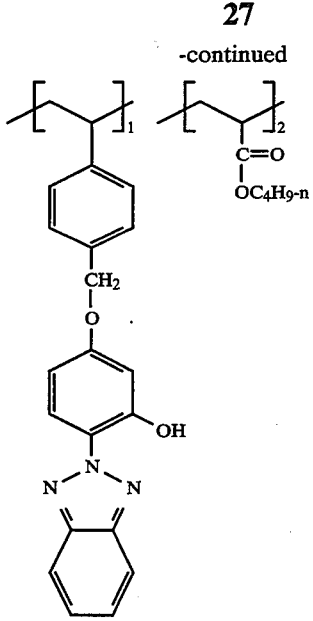

POL-2

UV-1

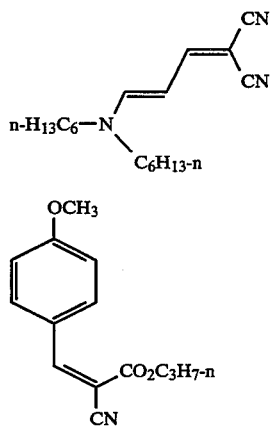

UV-2

EXAMPLE 1

A dispersion of liquid UV-2 was made in the presence of gelatin using standard dispersion techniques. The appropriate quantities of this dispersion were blended with a latex (that is, an aqueous dispersion) of POL-1 and allowed to stand at 40° C. for at least 1 hour prior to coating, to result in the loaded UV absorbing polymer latexes identified as "loaded POLUV-1" with the weight ratios indicated in Table 1 (below).

Comparative Samples 1, 4 and 7 were prepared by adding a 1:1 ratio (by weight) emulsion of dye UV-2 in 1,4-cyclohexylenedimethylene bis-(2-ethoxyhexanoate) to gelatin and applying the mixture to a transparent support. The quantities of dye UV-2 applied are shown in Table 1 (all quantities in this application are in g/m$^2$ unless otherwise indicated). Surfactants and coating aids were added to these samples as is commonly practiced in the art.

Comparative Samples 2, 5 and 8 were prepared in a manner analogous to Comparative Sample 1 but POL-1 was employed in place of the emulsions of UV-2 in oil.

Inventive Samples 3, 6 and 9 were prepared in a manner analogous to the Comparative Sample 2 but a loaded latex polymeric UV dye absorber was employed in place of liquid POL-1 as indicated in Table 1.

The spectrophotometric properties, as optical density at various wavelengths, of these nine samples are listed in Table. Also listed is the optical density expected for the coated loaded POLUV samples based on the assumption that the properties of the loaded POLUV could be predicted from the properties of the individual components.

TABLE 1

Spectrophotometric properties of various UV dyes and mixtures

| Sample | Composition | Optical Density | | | | |
|---|---|---|---|---|---|---|
| | | 420 nm | 400 nm | 380 nm | 360 nm | 330 nm |
| 1 (C) | 0.161 UV-2 (as dispersion) | 0.275 | 1.274 | 1.473 | 1.410 | 1.001 |
| 2 (C) | 0.054 POL-1 | 0.023 | 0.058 | 0.190 | 0.284 | 0.361 |
| | expected from mixture 1 + 2 | 0.298 | 1.332 | 1.663 | 1.694 | 1.362 |
| 3 (I) | loaded POLUV-1 comprising 0.161 UV-2 plus 0.054 POL-1 | 0.202 | 1.353 | 1.954 | 1.929 | 1.023 |
| 4 (C) | 1.115 UV-2 (as dispersion) | 0.221 | 0.963 | 1.146 | 1.082 | 0.779 |
| 5 (C) | 0.242 POL-1 | 0.003 | 0.043 | 0.283 | 0.662 | 0.853 |
| | expected from mixture 4 + 5 | 0.224 | 1.006 | 1.429 | 1.774 | |
| 6 (I) | loaded POLUV-1 comprising 0.118 UV-2 plus 0.242 POL-1 | 0.046 | 1.069 | 2.153 | 2.301 | 1.217 |
| 7 (C) | 0.075 UV-2 (as dispersion) | 0.153 | 0.641 | 0.822 | 0.759 | 0.555 |
| 8 (C) | 0.430 POL-1 | 0.005 | 0.047 | 0.391 | 1.040 | 1.354 |
| | expected from mixture 7 + 8 | 0.158 | 0.688 | 1.213 | 1.799 | 1.909 |
| 9 (I) | loaded POLUV-1 comprising 0.075 UV-2 plus 0.430 POL-1 | 0.022 | 0.661 | 1.687 | 2.089 | 1.582 | where (C) is Comparative and (I) is Inventive

As is readily apparent on inspection of the spectrophotometeic data shown in Table 1, the coatings (samples 3, 6 and 9) incorporating a POLUV sample prepared by loading a UV light absorbing polymer with a liquid UV light absorbing dye according to the current invention provide an unexpected shift in the wavelength of maximum absorptance and an unexpected increase in the maximum density (that is, greater than the sum provided by the polymer or monomeric UV individually). The properties of the loaded latex polymer, POLUV-1, are therefore distinct from and superior to those anticipated based on the properties of the UV absorbing polymer latex and the non-polymeric (in the example, monomeric) UV absorbing compound.

EXAMPLE 2

This example illustrates the advantages of a multilayer photographic element of the present invention.

A mixture of POL-1 or POL-2 loaded with monomeric UV absorbing compound UV-2 in the ratio of 45 parts (polymer) to 8 parts UV-2 (ratio by weight) was used in the multilayer photographic elements described in the below examples. These loaded latex polymeric UV dye absorbers were prepared as described in Example 1.

A color photographic recording material (Photographic Sample 101) for color negative development was prepared by applying the following layers in the given sequence to a transparent support of cellulose triacetate. The quantities of silver halide are given in grams of silver per square meter. The quantities of other materials are given in grams per square meter (the material amounts are stated simply as "g" but it will be understood that this is measured as $g/m^2$). All silver halide emulsions were stabilized with 2 grams of 4-hydroxy-6-methyl-1,3,3a,7-tetraazaindene per mole of silver.

Compounds M-1, M-2 and D-2 were used as emulsions containing tricresylphosphate; compounds C-1, C-2 and D-3 were used as emulsions comprising di-n-butyl phthalate; compound D-1 was used as an emulsion comprising N-n-butyl acetanilide; while compounds UV-1 and UV-2 were used as 1:1 emulsions comprising 1,4-cyclohexylenedimethylene bis-(2-ethoxyhexanoate).

Layer 1 {Antihalation Layer} black colloidal silver sol containing 0.215 g of silver, dye UV-1 at 0.075 g, dye MD-1 at 0.022 g, MM-2 at 0.097 g, scavenger S-1 at 0.11 g with 1.08 g gelatin.

Layer 2 {Interlayer} Oxidized developer scavenger S-1 at 0.11 g and 1.08 g of gelatin.

Layer 3 {First Red-Sensitive Layer} Red sensitized silver iodobromide emulsion [3.8 mol % iodide, average grain diameter 0.4 microns, average grain thickness 0.1 micron] at 0.25 g, cyan dye-forming image coupler C-1 at 0.60 g, DIR compound D-7 at 0.016, cyan dye-forming masking coupler CM-1 at 0.054 g, compound B-1 at 0.032 g, with gelatin at 1.29 g.

Layer 4 {Second Red-Sensitive Layer} Red sensitized silver iodobromide emulsion [4 mol % iodide, average grain diameter 0.56 microns, average grain thickness 0.14 micron] at 0.43 g, cyan dye-forming image coupler C-2 at 0.15 g, DIR compound D-7 at 0.027, cyan dye-forming masking coupler CM-1 at 0.032 g with gelatin at 1.29 g.

Layer 5 {Third Red-Sensitive Layer} Red sensitized silver iodobromide emulsion [4 mol % iodide, average grain diameter 1 microns, average grain thickness 0.12 microns] at 0.41 g, cyan dye-forming image coupler C-2 at 0.09 g, DIR compound D-7 at 0.032 g, DIR compound D-9 at 0.005 g, cyan dye-forming masking coupler CM-1 at 0.011 g with gelatin at 1.18 g.

Layer 6 {Interlayer} Oxidized developer scavenger S-1 at 0.11 g and 1.08 g of gelatin.

Layer 7 {First Green-Sensitive Layer} Green sensitized silver iodobromide emulsion [4 mol % iodide, average grain diameter 0.4 microns, average thickness 0.1 microns] at 0.16 g, magenta dye-forming image coupler M-1 at 0.11 g, magenta dye-forming image coupler M-2 at 0.16 g, DIR compound D-1 at 0.006 g, magenta dye-forming masking coupler MM-1 at 0.054 g, BAR compound B-3 at 0.022 g with gelatin at 0.86 g.

Layer 8 {Second Green-Sensitive Layer} Green sensitized silver iodobromide emulsion [4 mol % iodide, average grain diameter 0.56 microns, average thickness 0.14 microns] at 0.48 g, magenta dye-forming image coupler M-1 at 0.09 g, magenta dye-forming image coupler M-2 at 0.045 g, DIR compound D-1 at 0.009 g, magenta dye-forming masking coupler MM-1 at 0.032 g, with gelatin at 1.29 g.

Layer 9 {Third Green-Sensitive Layer} Green sensitized silver iodobromide emulsion [4 mol % iodide, average grain diameter 1 microns, average grain thickness 0.12 microns] at 0.38 g, magenta dye-forming image coupler M-1 at 0.032 g, magenta dye-forming image coupler M-2 at 0.016 g, magenta dye-forming masking coupler MM-1 at 0.011 g, DIR compound D-2 at 0.003 g, DIR compound D-12 at 0.01 g, with gelatin at 1.13 g.

Layer 10 {Interlayer} Oxidized developer scavenger S-1 at 0.11 g, dye YD-2 at 0.15 g with 1.08 g of gelatin.

Layer 11 {First Blue-Sensitive Layer} Blue sensitized silver iodobromide emulsion [3.6 mol % iodide, average grain diameter 0.4 microns, average grain thickness 0.1 micron] at 0.15 g, blue sensitized silver iodobromide emulsion [3.6 mol % iodide, average grain diameter 0.56 microns, average grain thickness 0.14 micron] at 0.19 g, yellow dye-forming image coupler Y-2 at 0.94 g, DIR compound D-3 at 0.054 g, with gelatin at 1.72 g.

Layer 12 {Second Blue-Sensitive Layer} Blue sensitized silver iodobromide emulsion [4 mol % iodide, average grain diameter 1 microns, average grain thickness 0.13 microns] at 0.40 g, yellow dye-forming image coupler Y-2 at 0.16 g, DIR compound D-3 at 0.032 g, with gelatin at 1.72 g.

Layer 13 {Protective Layer 1} 0.108 g of dye UV-1, 0.118 g of dye UV-2, unsensitized silver bromide Lippman emulsion at 0.108 g, dye CD-2 at 0.006 g, polymer latex A at 1.08 g with gelatin at 1.08 g and surfactant PF-1.

Layer 14 (Protective Layer 2) Anti-matte polymethylmethacrylate beads at 0.0538 g with gelatin at 0.91 g and surfactant PF-2.

The foregoing film was hardened at coating with 2% by weight to total gelatin of hardner H-1. Surfactants, coating aids, scavengers, soluble absorber dyes and stabilizers were added to the various layers of this sample as is commonly practiced in the art.

Photographic Sample 102 was like Photographic Sample 101 except that the emulsions of UV dyes UV-1 and UV-2 in layer 13 were replaced by "loaded POLUV-1" in an amount sufficient to provide 0.48 g of UV absorbing polymer (POL-1) loaded with 0.086 g of UV-2. This composition of "loaded POLUV" was chosen with the intention of matching the static discharge protection afforded by the emulsions of UV dyes UV-1 and UV-2 as used in Photographic Sample 101. The criteria for matching static discharge protection was that described in the calibration experiments detailed above.

Photographic Sample 103 was like Photographic Sample 102 except Polymer Latex A was omitted from layer 13.

Photographic Sample 201 was generally prepared like Photographic Sample 101 except that the masking couplers CM-1 and MM-1 and DIR compound D-3 were omitted from the sample, the quantity of silver in layer 11 was adjusted to 0.30 g and the quantity of silver in layer 12 was adjusted to 0.32 g; layer 2 was omitted; and compound DIR-2 was added to layer 8 at 0.03 g and layer 9 at 0.007 g.

Photographic Sample 202 was like Photographic Sample 201 except that polymer latex A was omitted from layer 13.

Photographic Sample 203 was like Photographic Sample 202 except that the emulsions of UV dyes UV-1 and UV-2 in layer 13 were replaced by loaded POLUV- 2 in an amount sufficient to provide 0.48 g of UV absorbing polymer (POL-2) loaded with 0.086 g of UV-1.

Photographic Sample 204 was like Photographic Sample 203 except that polymer latex A was added to layer 13 at 1.08 g.

The total thickness of Samples 101 through 204 was between about 19 and 23 microns (excluding support) depending upon the particular composition.

The components of Polymeric Latex A employed in Example 2, including component monomers, relative proportions (by weight) and polymer $T_g$ ($T_g$ is the glass transition temperature) in degrees Centigrade are as follows:

Polymer Latex A: n-Butyl acrylate / 2-acrylamido-2-methylpropane sulfonic acid / 2-acetoacetoxyethyl methacrylate - - - (88:5:7) - - - Tg=−28° C.

Structures of various compounds listed above are either provided above or are as follows (note UV-1 and UV-2 are above also):

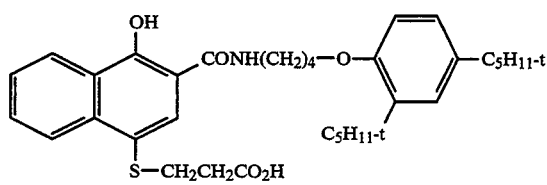

B-1

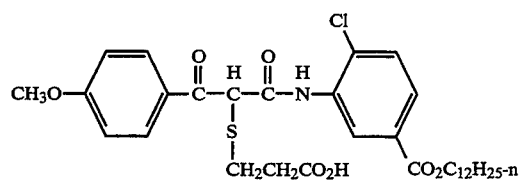

B-2

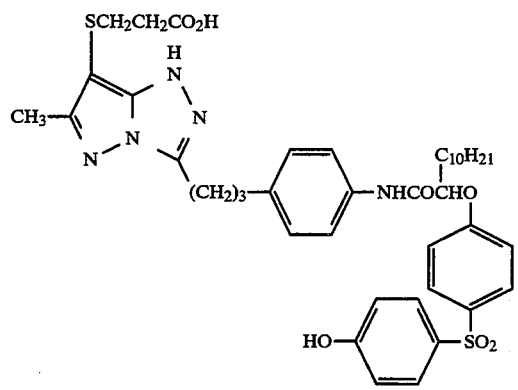

B-3

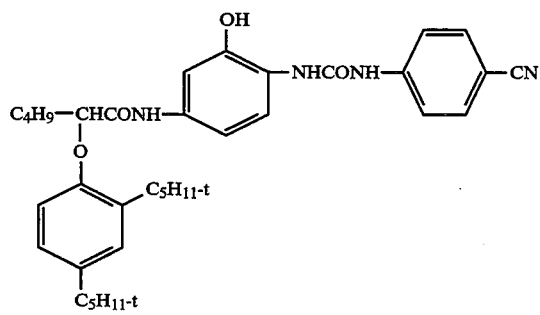

C-1

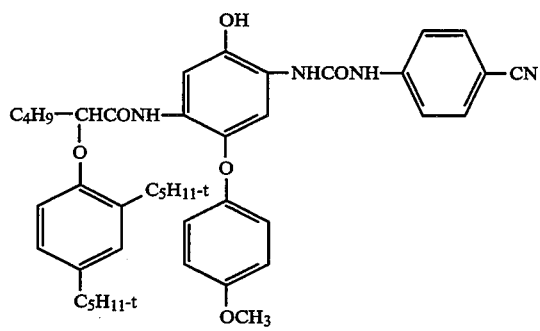

C-2

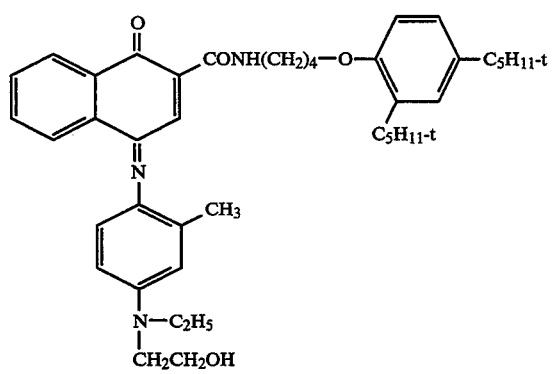
CD-2
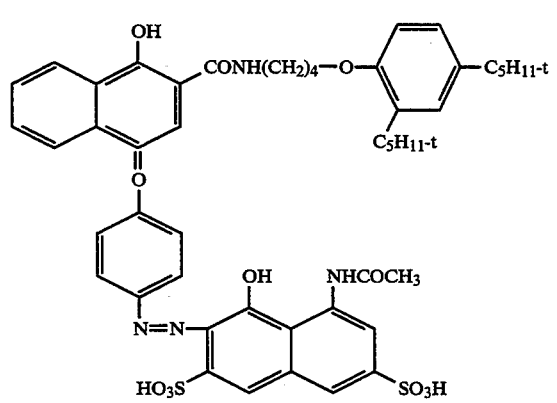
CM-1
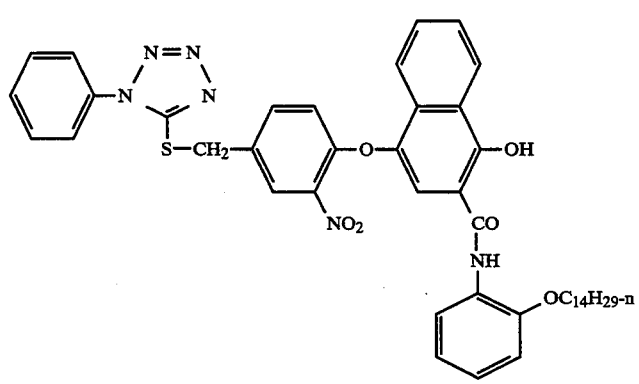
D-1
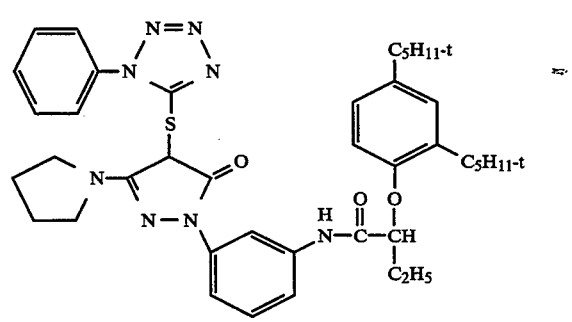
D-2

-continued
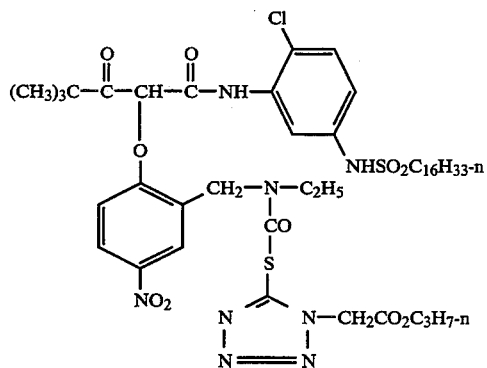
D-3
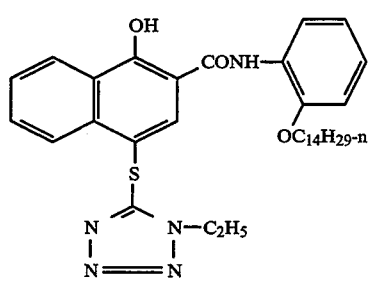
D-7
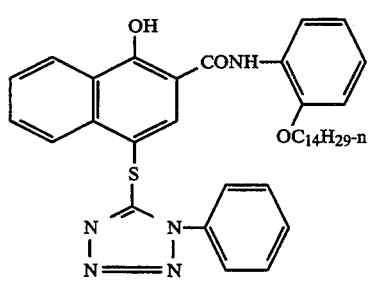
D-9
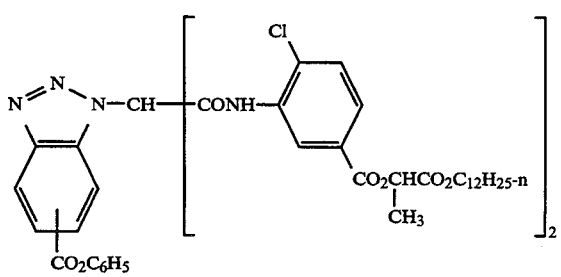
D-12
CH$_2$(SO$_2$CH=CH$_2$)$_2$  H-1
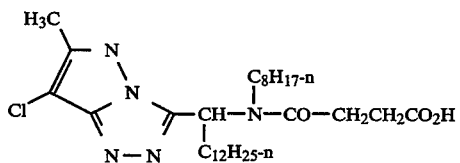
M-1

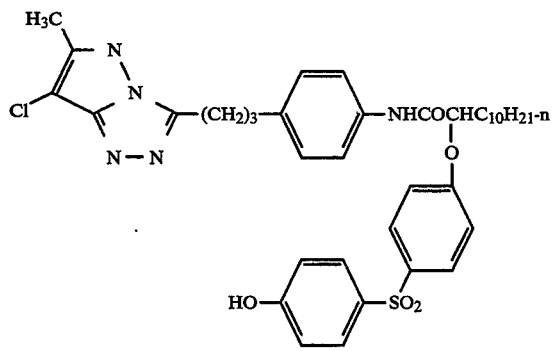
M-2
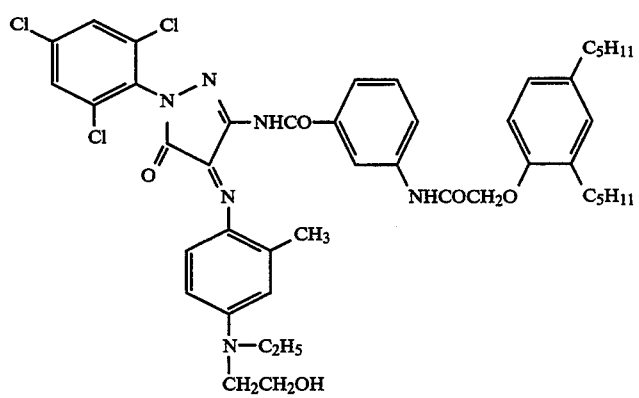
MD-1
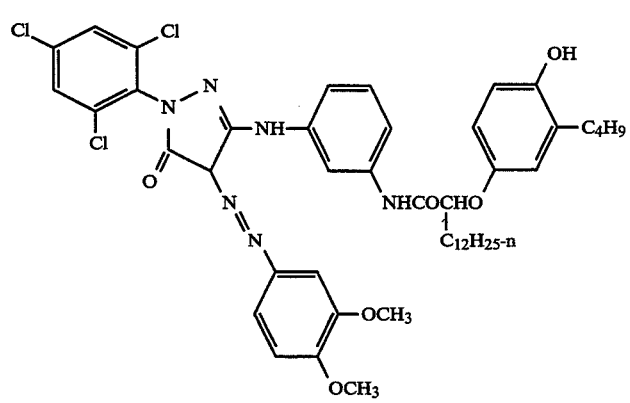
MM-1
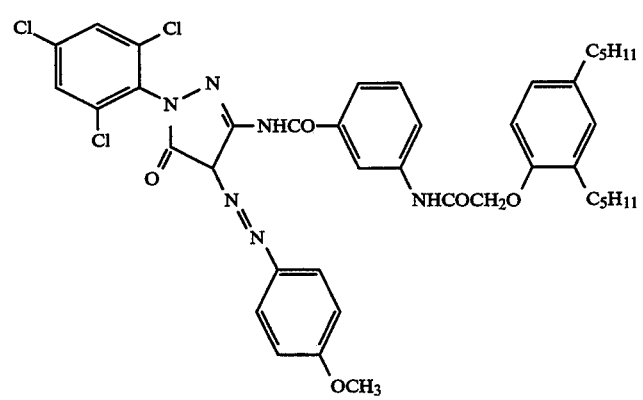
MM-2

-continued

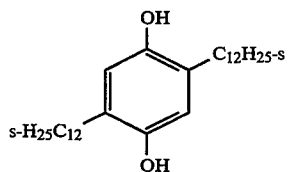
S-1

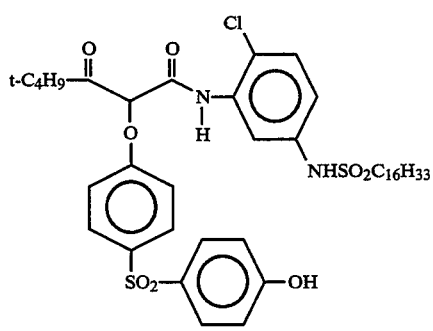
Y-2

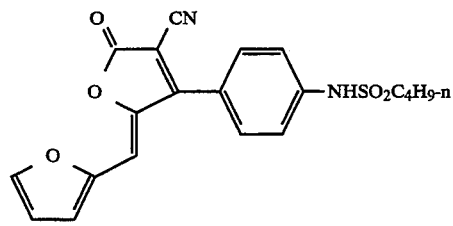
YD-2

PF-1=$C_8F_{17}SO_2NH(CH_2)_3N^+ (CH_3)_3.I^-$

PF-2=$C_8F_{17}SO_3^-.NH_4^+$

The pressure sensitivity of Photographic Samples 101 through 204 was evaluated by subjecting portions of each sample to 21psi pressure in a roller apparatus fitted with a sandblasted hardened steel wheel. The indentations and ridges on the sandblasted wheel mimic the effect of dirt particles or other imperfections on, for example, camera transport mechanisms.

Both pressured and unpressured portions of each sample were exposed to white light through a grey wedge chart. These samples were then developed using a color negative process, the KODAK C-41 process, generally as described in the British Journal of Photography Annual of 1988, pp. 196–198 (KODAK is a trademark of the Eastman Kodak Company, U.S.A.). The bleach bath was modified to comprise 1,3-propylene diamine tetraacetic acid.

The magnitude of the pressure effect was quantified by comparing the blue Dmin density of an unpressured portion of a sample to that of a pressured portion of the same sample. The increase in density observed with the pressured portion of a sample is the pressure-fog. Smaller values of the pressure-fog are superior in that they indicate that a particular film composition is less susceptible to forming unsightly marks and blemishes due, for example, to dirt or to imperfections in film transport apparatus. This results in improved quality for prints made from such a color negative film.

The static discharge sensitivity of Photographic Samples 101 through 204 was determined by exposing the samples to an electric arc discharge through a grey wedge chart. The samples were then developed as described above. The magnitude of the sensitivity to arc discharge was evaluated by determining the relative photographic speed of each sample from the change in blue density produced as a function of change in exposure. A greater insensitivity to static discharge is greatly preferred since this results in fewer unsightly static fog marks as induced by transport mechanisms employed in the manufacture or use of a film.

The scratch resistance of Photographic Samples 101 through 204 was evaluated by contacting either a dry sample (DRY) or a sample swollen in developer solution (WET) with a variably loaded sapphire stylus and determining the load required (in grams) to form a visible scratch or plow mark. Samples requiring a larger load are more scratch resistant.

The results of these tests are shown below in Table 2. For each sample, the pressure-fog is listed as the increase in Status M blue density as a result of the pressure test and the static sensitivity is listed relative to that of the relevant comparative sample. The DRY SCRATCH TEST and WET SCRATCH TEST results are also listed (values are in grams). Additionally, the presence of the polymer latex used as a pressure-protective material and the identity of the UV protective package is also listed.

TABLE 2

Static Sensitivity, Pressure Sensitivity and Scratch Resistance of Photographic Samples

| Photographic Sample | | Polymer Latex A | Static Sensitivity | Pressure-Fog +D | Scratch Test Dry | Scratch Test Wet |
|---|---|---|---|---|---|---|
| 101 (C) | UV-1 + UV-2 | yes | 100% | 0.05 | 60 | — |
| 102 (I) | loaded POLUV-1 | yes | 71% | 0.06 | >100 | — |
| 103 (I) | loaded POLUV-1 | no | 71% | 0.11 | >100 | — |
| 201 (C) | UV-1 + UV-2 | yes | 100% | 0.04 | 33 | 87 |
| 202 (C) | UV-1 + UV-2 | no | 100% | 0.13 | 73 | 81 |
| 203 (I) | loaded POLUV-2 | no | 60% | 0.15 | >100 | 82 |
| 204 (I) | loaded POLUV-2 | yes | 60% | 0.06 | >100 | 86 | where (C) is a Comparative and (I) is Invention

As can be readily appreciated on examination of the experimental data presented in Table 2, the samples incorporating the inventive "loaded POLUV" latexes show surprisingly large decreases in static discharge sensitivity when employed in a photographic element. This decrease in static discharge sensitivity is even larger than would have been predicted based on the additive properties of the individual components. Further, the combination of the "loaded POLUV" latexes and the low Tg latex simultaneously enables lower sensitivity to pressure and improved dry scratch resistance when compared to control samples. Wet scratch resistance is not degraded by these combinations. One would generally expect an aggregate of latexes to have the properties of a weighed average of the individual latexes. Apparently, in these mixtures, the pressure-fog resistance is dominated by the low Tg polymer latex while the scratch resistance is dominated by the loaded UV light absorbing latex.

The preceding examples are set forth to illustrate specific embodiments of this invention and are not intended to limit the scope of the compositions or materials of the invention. It will be understood that variations and modifications can be effected within the spirit and scope of the invention.

What is claimed is:

1. A photographic element comprising a light sensitive silver halide emulsion layer, and a UV absorbing polymer latex which is loaded with a non-polymeric UV absorbing compound, wherein the polymer is a homopolymer or heteropolymer comprising repeating monomeric units having the formula (I):

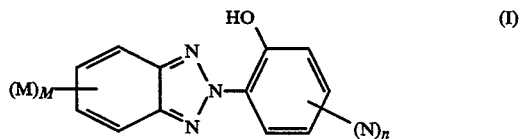

wherein: the phenyl ring and benzo ring are optionally additionally substituted; and one of m and n is 1, and M and N have the formula:

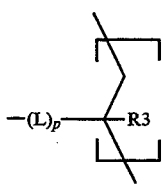

wherein R3 is H or an alkyl group; L is a bivalent linking group; and p is 0 or 1.

2. A photographic element according to claim 1 wherein the non-polymeric UV absorbing compound is a monomeric hydroxyphenylbenzotriazole, a monomeric hydroxy phenyl salicilate, a monomeric hydroxybenzophenone, a monomeric benzilidine malonate, or a substituted monomeric acrylonitrile.

3. A photographic element according to claim 1 wherein the UV absorbing polymer is a homopolymer or heteropolymer comprising monomeric units having the formula IA or IB:

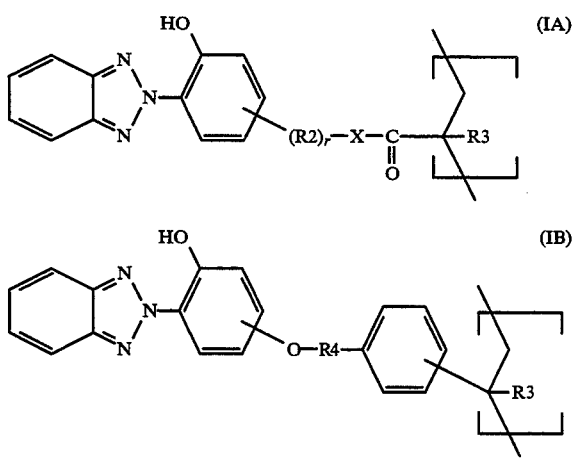

wherein:
X is O or NH;
R2 is $C_2$–$C_{10}$ is an alkylene group which may be straight chain or branched; and
R3 is H or 1 to 8 carbon alkyl group
R4 is $C_1$–$C_{10}$ alkylene group which may be straight chain or branched;
r is 0 or 1; and
the phenyl rings and benzo rings are optionally additionally substituted.

4. A photographic element according to claim 1 wherein the loaded polymer dispersion is present in the photographic element in an amount of between 0.01 g/m² and 5 g/m².

5. A photographic element according to claim 1 wherein the amount of monomeric UV absorbing compound loaded in the polymer is such that the weight ratio of UV absorbing monomer to polymer is between 1:99 to 99:1.

6. A photographic element according to claim 2 wherein the loaded polymer latex is incorporated into a gelatin gel of a photographic element.

7. A photographic element according to claim 2 wherein the polymer is a copolymer additionally having repeating units of either the formula:

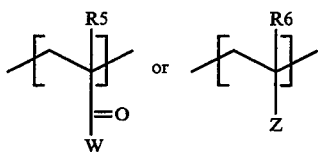

wherein: W is an amino group, alkoxy group, or a phenoxy group; Z is a phenyl group; and R5 and R6 are H or a 1 to 6 carbon atom alkyl group.

8. A photographic element according to claim 2 wherein the polymer is a copolymer and the molar ratio of repeating units other than formula I to repeating units of formula I, is no more than 4 to 1.

9. A photographic element according to claim 2 additionally comprising a support and at least one light sensitive silver halide emulsion layer, and wherein a gelatin layer containing the UV absorbing polymer latex is located further from the support than any silver halide emulsion layer.

10. A photographic element according to claim 2 additionally comprising a support, and wherein a gelatin layer containing the UV absorbing polymer latex is located on the opposite side of the support than the silver halide emulsion layer.

11. A photographic element according to claim 2 wherein the silver halide of the light sensitive silver halide emulsion layer, comprises tabular silver halide grains.

12. A photographic element according to claim 1 wherein the UV polymer has a glass transition temperature ($T_g$) of more than about +5° C., and the element additionally comprises in a layer between a light sensitive emulsion layer and an overcoat layer, a low $T_g$ polymer having a glass transition temperature of less than +5° C.

13. A photographic element according to claim 3 wherein the UV polymer has a glass transition temperature ($T_g$) of more than about +5° C. and the element additionally comprises in a layer between a light sensitive emulsion layer and an overcoat layer, a low $T_g$ polymer having a glass transition temperature of less than +5° C.

14. A photographic element according to claim 12 wherein the silver halide of the light sensitive emulsion layer comprises tabular silver halide grains.

15. A photographic element according to claim 13 wherein the silver halide of the light sensitive emulsion layer comprises tabular silver halide grains.

16. A photographic element according to claim 3 wherein $R_4$ is a methylene group.

17. A film with lens unit containing a photographic element according to claim 2.

18. A film with lens unit containing a photographic element according to claim 3.

19. A film with lens unit containing a photographic element according to claim 11.

20. A film with lens unit containing a photographic element according to claim 12.

21. A film with lens unit containing a photographic element according to claim 2, additionally comprising a support with a thickness of between about 50 to about 130 microns.

* * * * *